C. L. SOCKWELL.
LOCK LEVER FOR THRUST SCREWS.
APPLICATION FILED DEC. 16, 1916.
1,251,299.
Patented Dec. 25, 1917.
2 SHEETS—SHEET 1.
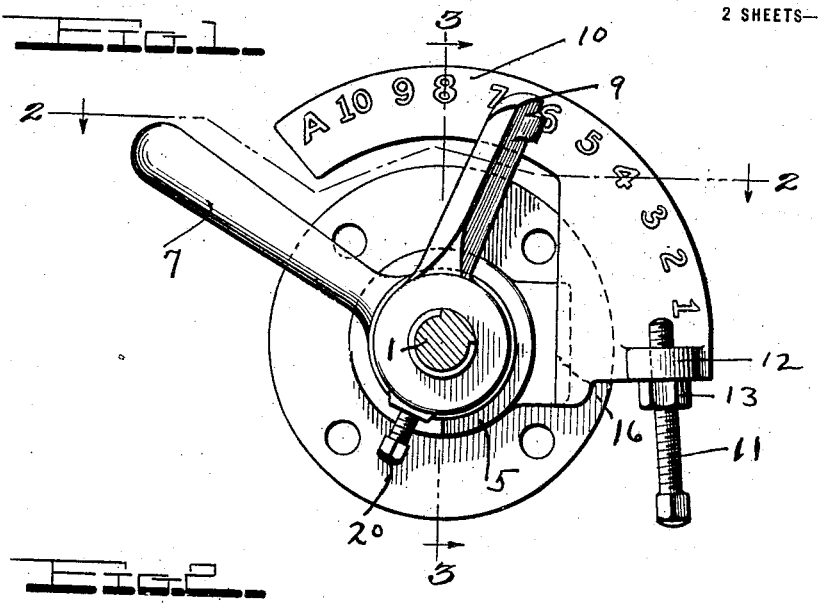
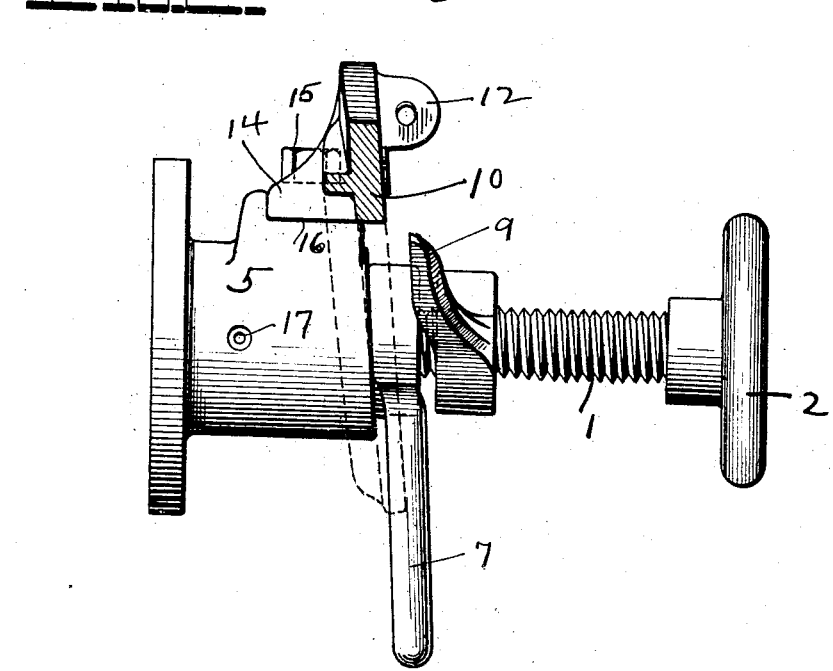
Inventor
Charlie L. Sockwell,
By Lester L. Sargent
Attorney
Witness
Chas. L. Grieshaver
M. L. Belt C. L. SOCKWELL.
LOCK LEVER FOR THRUST SCREWS.
APPLICATION FILED DEC. 16, 1916.
1,251,299.
Patented Dec. 25, 1917.
2 SHEETS—SHEET 2.
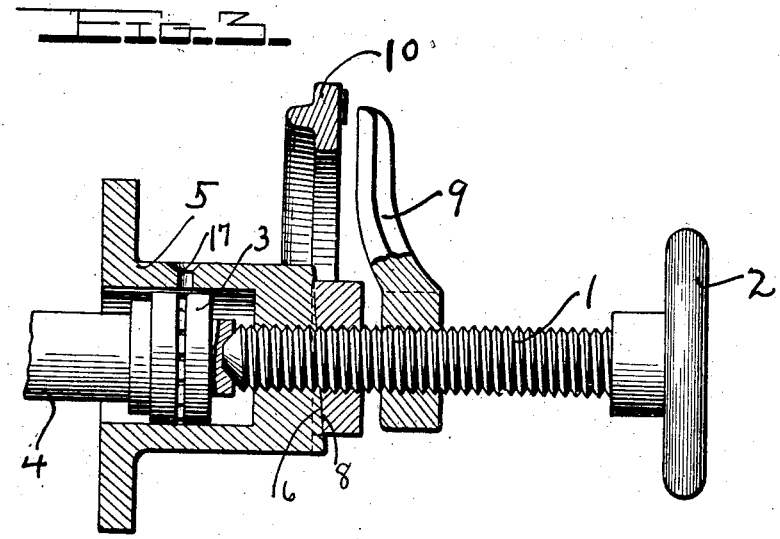
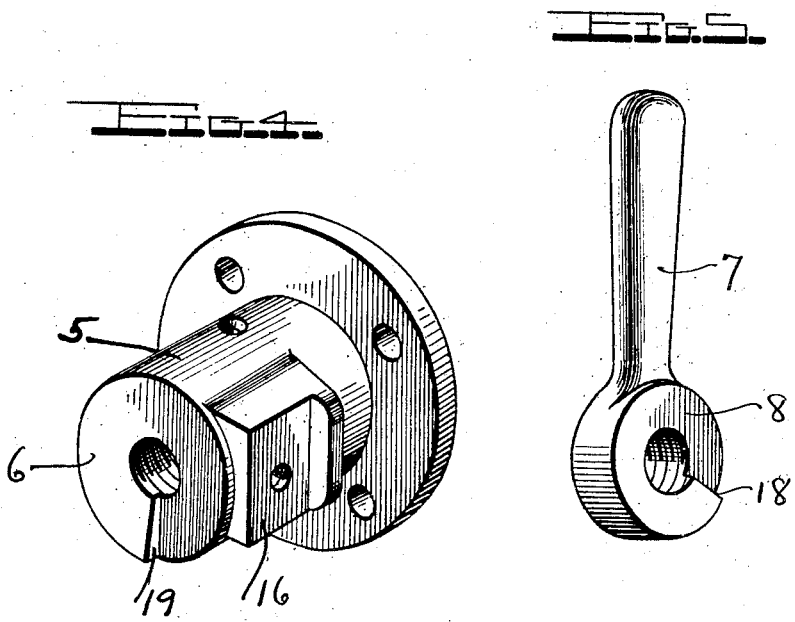
Witness
Chas. L. Grieshauer.
M. L. Belt.
Inventor
Charlie L. Sockwell,
By Lester L. Sargent
Attorney

UNITED STATES PATENT OFFICE.

CHARLIE L. SOCKWELL, OF NORTHWILKESBORO, NORTH CAROLINA.

LOCK-LEVER FOR THRUST-SCREWS.

1,251,299.  Specification of Letters Patent.  Patented Dec. 25, 1917.

Application filed December 16, 1916. Serial No. 137,329.

*To all whom it may concern:*

Be it known that I, CHARLIE L. SOCKWELL, a citizen of the United States, residing at Northwilkesboro, in the county of Wilkes and State of North Carolina, have invented a new and useful Lock-Lever for Thrust-Screws, of which the following is a specification.

The object of my invention is to provide an improved lock lever to fasten the thrust screw which screws into the chamber containing a ball bearing pressing against the main shaft of the mill, and which will not work loose in consequence of the jar of the mill when the mill is in operation. The old way of locking this thrust screw is to have a wheel or lever which turns forward with the thrust screw. The tendency is when the mill is in operation and the main shaft bearing against the thrust screw, to jar the thrust screw and old style lever backward and this permits the stones to separate which allows the corn to come through partly ground.

I attain the objects of my invention by the mechanism illustrated in the accompanying drawing, in which—

Figure 1 is a front elevation, the hand wheel not being shown; Fig. 2 a section on line 2—2 of Fig. 1; Fig. 3 a section on line 3—3 of Fig. 1; Fig. 4 a perspective of member 5; and Fig. 5 a perspective of member 7.

Similar numerals refer to similar parts throughout the several views.

Referring to the accompanying drawing, I provide a thrust screw 1 operated by hand wheel 2, the thrust screw operating against a suitable bearing 3 on the end of main shaft 4. The bearing 3 is mounted within the chambered portion of a stub shaft 5, adapted to be secured to the mill. The outer end of member 5 is provided with a cam face 6, as shown in Fig. 4. A lock lever 7 is provided with a cam face 8 corresponding in form with cam face 6 of member 5, cam face 6 having a shoulder 19, and cam face 8 having a shoulder 18, against which it engages. Also mounted on thrust screw 1 outwardly of lock lever 7, I provide a guide arm or pointer 9. The outer end of member 9 projects over an inclined segment 10 which is provided with markings comprising, preferably, consecutive numerals arranged as shown in Fig. 1. Member 10 is provided with a suitable regulating screw 11 mounted in flange 12 and fastened in the desired adjusted position by bolt 13, as illustrated in Fig. 1. Member 10 is provided with an extended portion 14 which is secured by bolt 15 to the raised or flat portion 16 of member 5, as illustrated in Figs. 2 and 4. To permit of lubricating bearing 3 an oil passage 17 is provided in member 5, as shown in Fig. 3.

The degree of fineness of grinding done by the mill is determined by shaft 4 which is regulated by hand wheel 2 and thrust screw 1 operating against a suitable bearing 3, as shown in Fig. 3. To lock thrust screw 1 in a predetermined position, the lock lever 7 is rotated until it becomes tight against the cam face or tapering end 6 of member 5, the shoulder 18 of lock lever 7 bearing against shoulder 19 of cam face 6. In this way the thrust screw is locked so that it cannot be caused to work loose in consequence of the jar of the mill when the mill is in operation. Pointer 9 may be turned to any desired marking on member 10 to regulate the fineness of the grinding for which the thrust screw is to be set. The regulating screw 11 may be set to any desired position projecting over the markings to limit the turning of pointer 9 which projects sufficiently to come into contact with the end of regulating screw 11. When the pointer 9 rests against the regulating screw 11 the burs of the mill can go no closer together. They are prevented from defacing themselves when the lock is released or the corn is all out. The pointer is rested on the screw 11 and the burs are run together as close as desired by loosening the set screw 20. Thrust screw 1 is tightened, and the mill locked by means of the reverse lever 7. Now it is locked both ways. The burs are kept from going closer together by the screw 11 and the set screw 20 which clamps the indicator 9 to the thrust screw 1, and from coming farther apart by the reverse lever 7.

What I claim is:

1. As a new article of manufacture, a lock lever comprising a handle portion, a hollow cylindrical portion threaded interiorly, the cylindrical portion having a cam face extending entirely around the member and a shouldered portion, as shown.

2. In a device of the class described, the combination of a chambered stub shaft, a main shaft, a bearing on the end of the main shaft, the bearing being slidably mounted in the chambered portion of the stub shaft, a thrust screw engaging against the bearing to effect adjustment of the main shaft, a lock lever having a cam face engaging against the correspondingly shaped end of the stub shaft, a pointer mounted on the thrust screw, and a segmental element carrying markings over which the pointer projects, the segmental element being rigidly attached to the chambered stub shaft.

3. In a device of the class described, the combination of a chambered stub shaft, a main shaft alined therewith, a bearing attached to the main shaft and slidably movable within the chambered portion of the stub shaft, a thrust screw element engaging against the bearing, a lock lever having a cam faced portion adapted to lock against the stub shaft, a pointer carried by the thrust screw, a segmental element carrying numerical markings to any of which the pointer may be turned, and means adjustably mounted on the segmental element for limiting the movement of the pointer within a predetermined limit to regulate the setting of the thrust screw and consequent adjustment of the main shaft, substantially as set forth.

CHARLIE L. SOCKWELL.

Copies of this patent may be obtained for five cents each, by addressing the "Commissioner of Patents. Washington, D. C."